United States Patent Office 3,338,922
Patented Aug. 29, 1967

3,338,922
PROCESS FOR PRODUCING α-TOCOPHEROL HAVING A HIGH VITAMIN E ACTIVITY
Shizumasa Kijima, Tokyo, and Tetsuya Nakamura, Urawa-shi, Japan, assignors to Eisai Company, Limited, Tokyo, Japan, a corporation of Japan
No Drawing. Filed Dec. 11, 1964, Ser. No. 417,794
Claims priority, application Japan, Jan. 24, 1964, 39/3,094
3 Claims. (Cl. 260—345.5)

This invention relates to a process for producing α-tocopherol having a high vitamin E activity.

It has been discovered that six kinds of tocopherol homologues, such as α-, β-, γ- and δ-tocopherols, exist in nature. Each of them is a substituted chroman having a phenolic hydroxyl radical in the 6-position of the nucleus.

α-Tocopherol is a compound having methyl radicals in the 5, 7 and 8-positions of tocol or 2-methyl-2-(4, 8, 12-trimethyl-tridecyl)-6-chromanol. Non-α-tocopherols as β-, γ- and δ-tocopherols are compounds in each of which one or two of the methyl radicals are replaced with hydrogen atoms. That is to say, β-tocopherol is 5, 8-dimethyl tocol, γ-tocopherol is 7, 8-dimethyl tocol, ξ-tocopherol is 5, 7-dimethyl tocol, η-tocopherol is 7-methyl tocol and δ-tocopherol is 8-methyl tocol.

These tocopherols are contained in abundance specifically in vegetable oils and, in most cases, 2 or 3 homologues are present as a mixture. It is known that the biological activities of these tocopherol homologues are remarkably different from one another and that α-tocopherol has the highest activity of these tocopherol homologues. However, in most cases, the percentage of α-tocopherol in vegetable oils useful as sources of tocopherol homologues is low. For example, the relative amounts of tocopherol homologues in soybean oil are 10% α-tocopherol, 60% γ-tocopherol and 30% δ-tocopherol.

Therefore, it is very necessary and important to obtain α-tocopherol, which is very important as a medicine and nutrient agent for human beings and animals, by adding 1 or 2 methyl radicals to the chroman nucleus of the non-α-tocopherols which exist in abundance in nature.

An object of the present invention is to convert non-α-tocopherols which are low in vitamin E biological activity to α-tocopherol having a high vitamin E biological activity and to carry out the conversion easily at a high rate of yield.

According to the present invention α-tocopherol is obtained from non-α-tocopherols by adding a hydroxymethyl radical on the chroman nucleus of a non-α-tocopherol by reacting formaldehyde with the non-α-tocopherol in the presence of boric acid and then converting the introduced hydroxy-methyl radical into a methyl radical by a known reducing method.

According to the process of the present invention, α-tocopherol is easily obtained by dissolving 1 mole of a monomer of a non-α-tocopherol or a mixture containing two or more of such monomers in an inert solvent so as to form a solution containing 1 to 50% by weight of the non-α-tocopherol, adding 1 to 5 moles of formaldehyde to said solution, adding a proper amount of boric acid to the solution as a catalyst, making the ingredients of the solution react while stirring and then reducing the reaction product.

The raw material containing non-α-tocopherol can be used irrespective of its purity. In nature, non-α-tocopherols often coexist with α-tocopherol. But, in the process of the present invention, the existence of such α-tocopherol in the raw material does not interfere with the reaction at all. Therefore, in the process of the present invention, even if the raw material is in the state of a crude mixture obtained from a vegetable oil, the purposes of the invention will be able to be accomplished.

The solvents that can be used in the present invention are such hydrocarbons as petroleum benzin, hexane, ligroin, benzene, toluene and xylene, isopropylether, acetone and dioxane. But, with methanol, ethanol, their hydrous solvents, hydrous acetone or hydrous dioxane, the reaction will hardly proceed. The reaction temperature is not critical. Any temperature ranging from the room temperature to the boiling point of the solvent can be used. Regarding the formaldehyde, it is most preferable in carrying out the reaction to add paraformaldehyde as a solid to the reaction solution. However, an aqueous solution of formaldehyde (formalin) may be used. Where an aqueous solution of formaldehyde is used, the reaction will barely proceed in solvents which are freely miscible with water, such as acetone or dioxane as described above. Hence, it will be necessary to use a hydrocarbon which does not appreciably mix with water, or isopropylether, as a solvent. When boric acid is added in the form of crystals to the reaction solution, the reaction will proceed favorably. However, it may be added in the form of a solution with a proper solvent to the reaction solution. As boric acid will act as a catalyst, the amount of it added is not critical and the purposes of the invention can be well attained by the use of a small amount. The reaction time can be varied depending on the kind of the solvent, the reaction temperature and the amount of the reactants.

The hydroxymethyl radicals of thus obtained non-α-tocopherols having 1 or 2 substituted hydroxymethyl radicals can be easily reduced to methyl radicals. As proper reducing methods, there can be used a method of treating it with an active metal, such as zinc, and an inorganic acid, such as hydrochloric acid, a method of treating it with a zinc-mercury amalgam and an inorganic acid by the Clemensen method and a catalytic hydrogenating method by using a proper hydrogenating catalyst, such as nickel or palladium. However, all the other known methods for reducing hydroxymethyl radicals also can be used. By using such reducing methods, such hydroxymethyl tocopherols as 5-hydroxymethyl-7,8-dimethyl tocol, 7-hydroxymethyl-5,8-dimethyl tocol, 7-hydroxymethyl-5,8-dimethyl tocol, 8-hydroxymethyl-5,7-dimethyl tocol, 5,7-dihydroxymethyl-8-methyl tocol and 5,8-dihydroxymethyl-7-methyl tocol are easily converted to 5,7,8-trimethyl tocol or α-tocopherol.

It is known that, in the nuclear alkylation of an aromatic compound, the rate of yield of the desired product is usually low. Specifically, with phenol, the polymerization under the reaction condition will occur so quickly that a diphenyl methane derivative and a further condensed higher condensate will be produced and that, therefore, the rate of yield of the expected nuclear alkylated product of phenol is very low. But, in the process of the present invention, such a condensation product will not be produced at all. This is an important feature of the present invention. Thus, α-tocopherol can be obtained at a rate of yield much higher than by any known conventional process. This is because, in the process of the present invention, the reaction proceeds so favorably in the presence of the anhydrous inert solvent that, even if the reaction time is extended and the reaction temperature is high, no secondary reaction will occur but only the expected hydroxymethylation will occur.

The hydroxymethylation of phenol can be carried out by combing various reactions. However, as a reaction for directly introducing a hydroxymethyl radical into phenol, there is known only the Lederer-Manasse reaction of making phenol react with formaldehyde using a base, such as caustic soda, as a catalyst. However, in said reaction, the rate of yield of the obtained hydroxymethyl phenol is generally low. On the other hand, the process of the present invention is not only a method of combining various reactions but also a method of directly introducing a hydroxymethyl radical and yet it has such a high rate of yield as compared with the above-described Lederer-Manasse reaction as to be a very advantageous economical process.

The other advantages of the process of the present invention are that, as special conditions, such as the use of a high pressure strictly dehydrated state or corrosive agent, are not required at all, no special reactor is required and the danger of the reaction is very low. Further, all the agents used in the reaction are so cheap that $\alpha$-tocopherol can be produced very economically.

Means for chemically analyzing tocopherols have recently made a rapid progress and the quantitative determination of individual tocopherols in a tocopherol homologue mixture now can be accurately and quickly made. Suitable means include, for example, a reversed-phase chromatography, distribution chromatography, thin-layer chromatography and gas chromatography. Therefore, the results shown by these analyzing means are very accurate and are very high in reliability. The rates of yield of $\alpha$-tocopherol mentioned in the examples of the present invention were all determined by one or a combination of these analyzing means and are therefore reliable. On the other hand, the rates of yield and the analytical values of $\alpha$-tocopherol mentioned in such known conventional data of methylation of non-$\alpha$-tocopherols were determined in earlier days when such analyzing means were not available and, hence, are of doubtful accuracy.

An example of the process of the present invention shall be given in the following. However, this is given merely for illustration. The present invention is not limited to the specific details of this example.

*Example*

25.0 g. of concentrated soybean oil (containing 92% of total tocopherols, 11% 5,7,8-trimethyl tocol, 58% 5.7-dimethyl tocol and 31% 8-methyl tocol) were dissolved in 150 ml. of toluene, 4.3 g. of paraformaldehyde and 2.1 g. of crystalline boric acid were added to the solution. The mixture was made to react under reflux for 8 hours. When the reaction solution was then reduced by the Clemensen method, 24.8 g. of a light brown oil soluble in methanol were obtained. When this oil was analyzed, it was confirmed to contain no other Emmerie-Engel positive substance other than $\alpha$-tocopherol. The purity as determined by Emmerie-Engel's method was 90.2%. The rate of yield was 97%.

Although particular preferred embodiments of the invention have been disclosed above in detail for illustrative purposes, it will be recognized that variations or modifications of such disclosure, which come within the scope of the appended claims, are fully contemplated.

What is claimed is:

1. In a process for producing $\alpha$-tocopherol from non-$\alpha$-tocopherols having at least one hydrogen atom in the benzene nucleus, comprising the steps of hydroxymethylating said hydrogen atom or atoms of the non-$\alpha$-tocopherol and then reducing the introduced hydroxymethyl radical to a methyl radical, the improvement which comprises carrying out the hydroxymethylation step by reacting formaldehyde with a non-$\alpha$-tocopherol or a mixture of non-$\alpha$-tocopherols, in the presence of boric acid, and in a non-aqueous medium, using an anhydrous inert solvent selected from the group consisting of petroleum benzin, hexane, ligroin, benzene, toluene, xylene, isopropylether, anhydrous acetone and anhydrous dioxane.

2. A process as claimed in claim 1, wherein said formaldehyde is paraformaldehyde.

3. A process as claimed in claim 1, wherein said boric acid is added in crystalline form to the reaction system.

References Cited

UNITED STATES PATENTS 2,673,858   3/1954   Weisler _____ 60—345.5
2,909,568   10/1959   Gleim _____ 60—619 XR

FOREIGN PATENTS 1,149,167   5/1963   Germany.

WALTER A. MODANCE, *Primary Examiner.*

N. S. MILESTONE, *Examiner.*